(12) United States Patent
Spinelli (10) Patent No.: US 8,191,463 B2
(45) Date of Patent: Jun. 5, 2012

(54) COFFEE MACHINE WITH LOSING FILTER OR CAPSULE

(75) Inventor: Giovanni Spinelli, Parabita (IT)

(73) Assignee: Spinel, S.r.L., Parabita (LE) (IT)

( * ) Notice: Subject to any disclaimer, the term of this patent is extended or adjusted under 35 U.S.C. 154(b) by 734 days.

(21) Appl. No.: 12/224,962

(22) PCT Filed: Mar. 8, 2007

(86) PCT No.: PCT/IT2007/000173
§ 371 (c)(1),
(2), (4) Date: Sep. 10, 2008

(87) PCT Pub. No.: WO2007/105249
PCT Pub. Date: Sep. 20, 2007

(65) Prior Publication Data
US 2009/0114100 A1    May 7, 2009

(30) Foreign Application Priority Data

Mar. 10, 2006    (IT) .............................. LE2006A0009

(51) Int. Cl.
*A47J 31/40* (2006.01)

(52) U.S. Cl. .......... 99/289 R; 99/295; 99/302 P; 99/280

(58) Field of Classification Search ................... 99/295, 99/289 R, 302 P, 280, 281, 282
See application file for complete search history.

(56) References Cited

U.S. PATENT DOCUMENTS

| | | | | |
|---|---|---|---|---|
| 3,628,444 A * | 12/1971 | Mazza | ........................... | 99/275 |
| 3,660,117 A * | 5/1972 | Neely | ........................... | 99/289 R |
| 4,389,924 A * | 6/1983 | Hoesselbarth | ............. | 99/289 R |
| 4,389,925 A * | 6/1983 | Piana | ........................... | 99/289 R |
| 5,134,924 A * | 8/1992 | Vicker | ........................... | 99/280 |
| 5,855,161 A * | 1/1999 | Cortese | ........................... | 99/289 P |

* cited by examiner

*Primary Examiner* — Reginald L Alexander
(74) *Attorney, Agent, or Firm* — R. Ruschena Patent Agent, LLC (57) ABSTRACT

An espresso machine using an innovative, semi-automatic, mechanical system to load and discard the disposable coffee filter or capsule, comprising a novel system of sealing and applying pressure on the disposable filter or capsule to avoid spurts of coffee or hot water while the coffee is brewed, consisting of a completely mechanical clamping system of sealing between the capsule and the infusion piston by manually adjusting the distance between the capsule and the piston and the use of an electro-mechanical control system to verify that the capsule is properly lodged and to verify the lodging pressure of the brewing piston.

7 Claims, 11 Drawing Sheets

COFFEE MACHINE WITH LOSING FILTER OR CAPSULE

RELATED APPLICATIONS

The application is a U.S. National Stage application according to 35 U.S.C. 371 of PCT/IT2007/000173 application filed on 8 Mar. 2007.

The applications claims foreign priority according to 35 USC 119(e) on Italian patent application LE2006A000009 filed on Mar. 10, 2006.

TECHNICAL FIELD

The present invention relates to a coffee or espresso machine using a disposable filter or capsule, equipped with a semi-automatic system operating in two phases:
1) Manual placement of the disposable filter or capsule;
2) Coffee brewing and return to phase 1 by electronic control and electro-mechanical actuators.

Espresso machines of this type use a special one-cup semi-rigid plastic filter, which contains grounded, dosed and tamped coffee, also referred as disposable filter or capsule. Hereafter it will be identified as capsule. In the espresso machines on the market the same pump generally operates the hydraulic clamping system, the automatic disposal of the used capsule, and the coffee brewing as well. This means that the total pressure is proportionally distributed between the clamping/disposal and the brewing. Such a pressure distribution among three systems, however, does not allow a good quality of the final product and a good clamping pressure, producing water leakage and scaling inside the machine. Moreover, the capsule filling/disposal system is rather complex and unreliable for it uses a spring mechanism, which is likely to loose the original mechanical features due to the use and high temperatures.

Aim of the present invention is an absolutely innovative, mechanical system to load and remove the disposable filter or capsule, which presents high strength and reliability at the high pressure. Another aim of the present invention is a mechanical system of sealing and applying pressure on the disposable filter or capsule.

DISCLOSURE OF THE INVENTION

Espresso machine with disposable filter or capsule, equipped with a semi-automatic system to brew espresso coffee, characterized by the following features:

A semi-automatic, totally mechanical system to load and discard the disposable filer or capsule. The counter-clockwise rotation, when closing, of the capsule by rotating the filter holder body, creates a housing geometrically fit for the capsule; the perfect overlap of the two bodies is guided by a grooving and tonguing joint and a ball pressed on the bottom of the rotating body that is housed inside a spherical cavity on the fixed body. During the coffee brewing, a vertical and ring joint stabilizes the two mechanical parts and allows a perfect and rigid grasp between the two bodies, balancing the high pressures during the brewing. This implies a perfect housing of the capsule and avoids possible deformations produced by the combined effect, by the type of plastic material, and by the high working pressure and water temperatures. The rear sensor rod and the front gravity extractor are positioned in a way to ensure, once the brewing is over, the removal of the used capsule that is discarded into a small container located on the bottom of the machine chassis. While brewing, in fact, the capsule could adhere to the housing surfaces in case it is deformed by pressure and temperature. After the removal, the device is automatically ready to receive a new capsule manually inserted for the next brewing. The system is solid, reliable, and allows to repeat the placement and removal of the capsule with a rotation of 60° of the rotating part.

A full mechanical clamping system of the capsule infusion piston operated in conjunction among the pressure cam, the tappet, the heat exchanger and the infusion piston, has a double function: to clamp the piston and to feed the electric circuit of the electro-pump with a synchronized system comprising a brewing cam connected to the motor shaft, which activates a micro-switch. In fact, only when the capsule is on its place, the electro-motor starts rotating, clockwise, of 180°; it drags the pressure cam and, at the same time, lowers the brewing cam which insure, by its synchronized position, that the capsule is pressed and, at the same time, sets in motion the electro-pump and the brewing. This system allows to conserve the total working power of the electro-pump for the brewing effort, ensuring an excellent coffee, no water leakage and absence of scaling or premature wear of the mechanisms.

A double possibility to adjust the distance between the capsule and the piston. This is achieved by a macro-regulation by mean of the piston rotation (clockwise or counterclockwise), increasing or decreasing the distance from the capsule, as a macro-regulation; a micro-regulation by mean of the tappet sliding inside the housing shaped on the heat exchanger, controlled by two Belleville washers and limited by a threaded dowel. This regulation allows an accurate adjustment to compensate for possible flaw of the capsule.

An electro-mechanical control system to verify that the capsule is properly lodged and verifies the lodging pressure of the brewing piston. This guarantees that the machine works under these conditions, thus reducing the number of manual operations is reduced.

Purposes, advantages and features of the present invention will be more understandable with the detailed description of a preferred but not limited to, embodiment, reported as an example. Reference will be made to the attached drawing in which.

WAYS OF CARRYING OUT THE INVENTION

Figure 1:
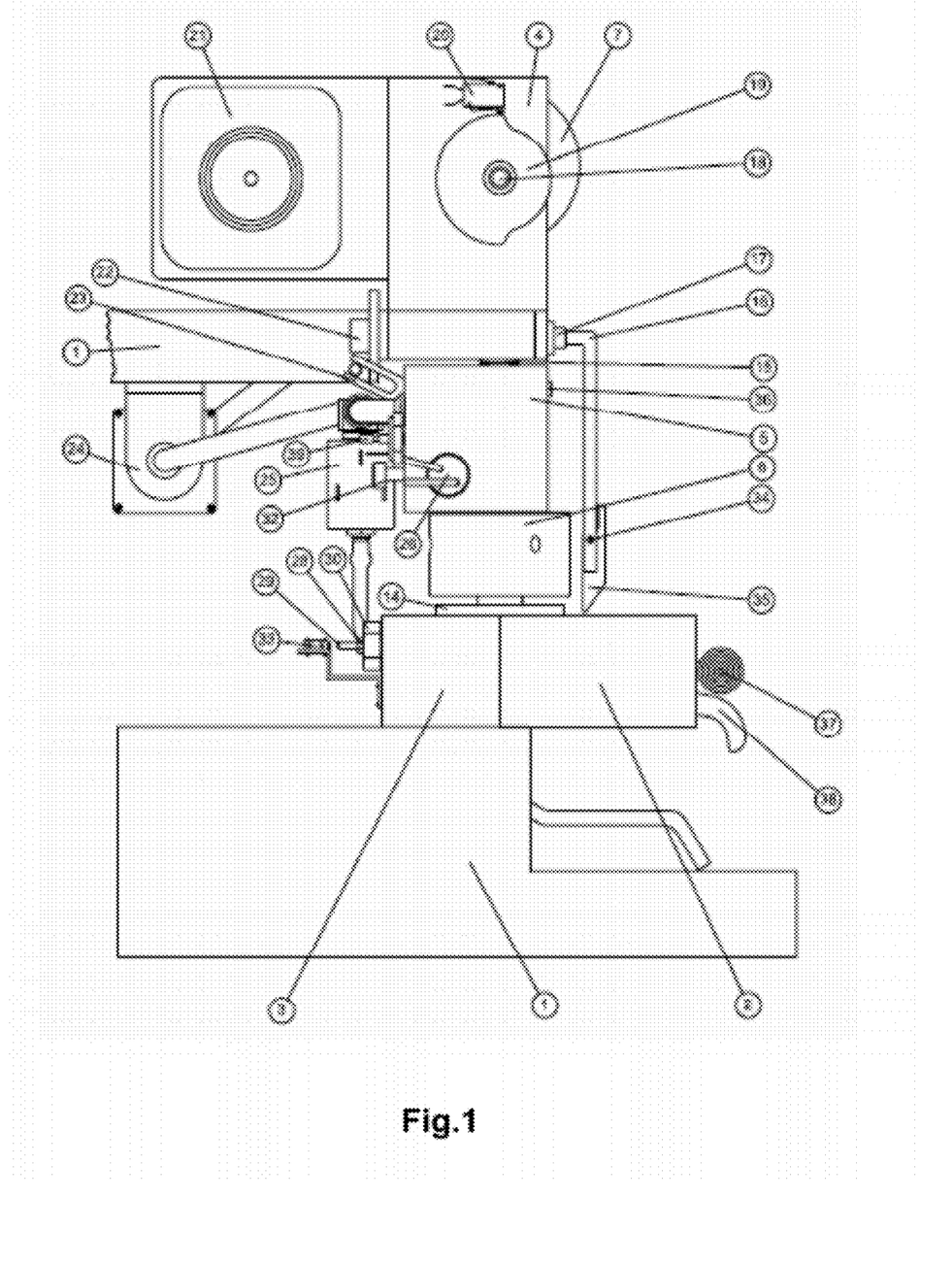
FIG. 1 shows the espresso machine, internal left side.
Figure 2:
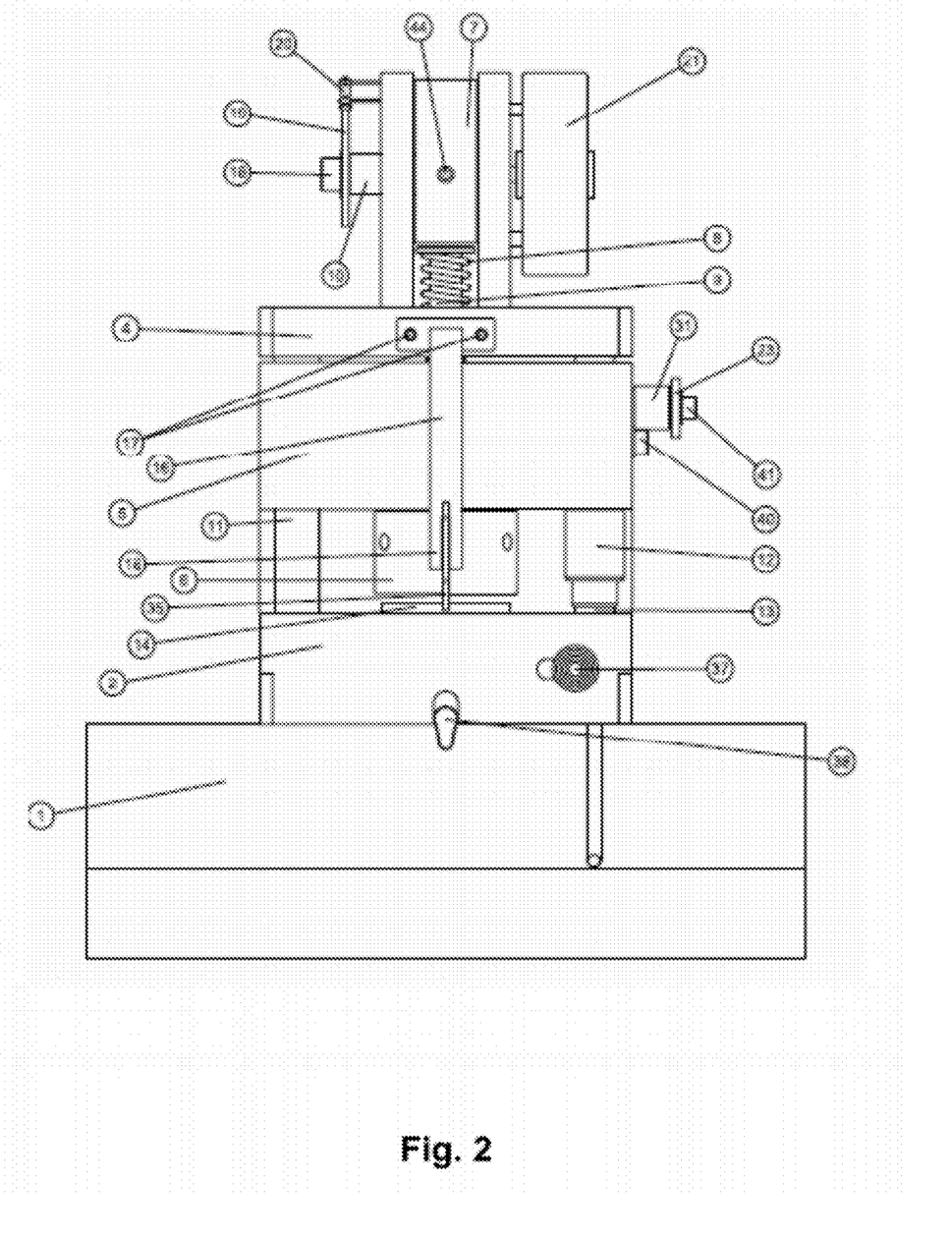
FIG. 2 shows the espresso machine, internal front side.
Figure 3:
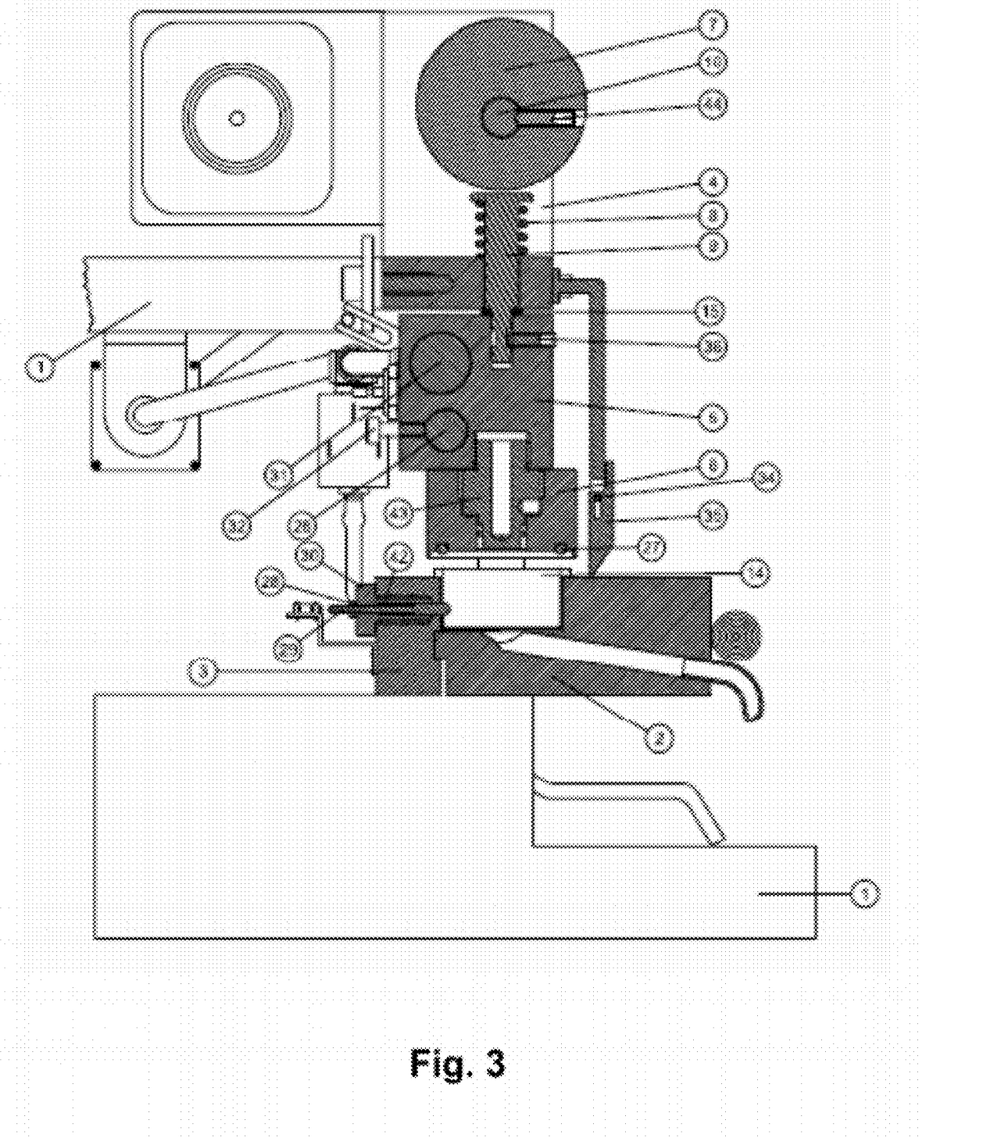
FIG. 3 shows a longitudinal section of the center line and shows the assembling system of the mechanical elements.

Referring to the drawings, and particularly to FIGS. 1, 2 and 3, the espresso machine consists of a chassis 1, a capsule-holder body comprising a rotating part 2 and a fixed part 3, equipped with a knob 37, a brewing spout 38, a sensor shaft 29, a micro-switch 33 and front extractor 35 which can lodge a disposable filter or capsule 14, a heat exchanger 5, with electro-pump 24, electro-valve for water delivery 25, a heater 26 and thermostat 39, a piston 31 and related ciclers 43, tappet 9 and an accelerator 31, a pressure cam 7, and a coffee brewing cam 19 with micro-switch 20, both controlled by an electro-motor 21, supporting means, fixing means, regulation and sealing means.

Figure 5:
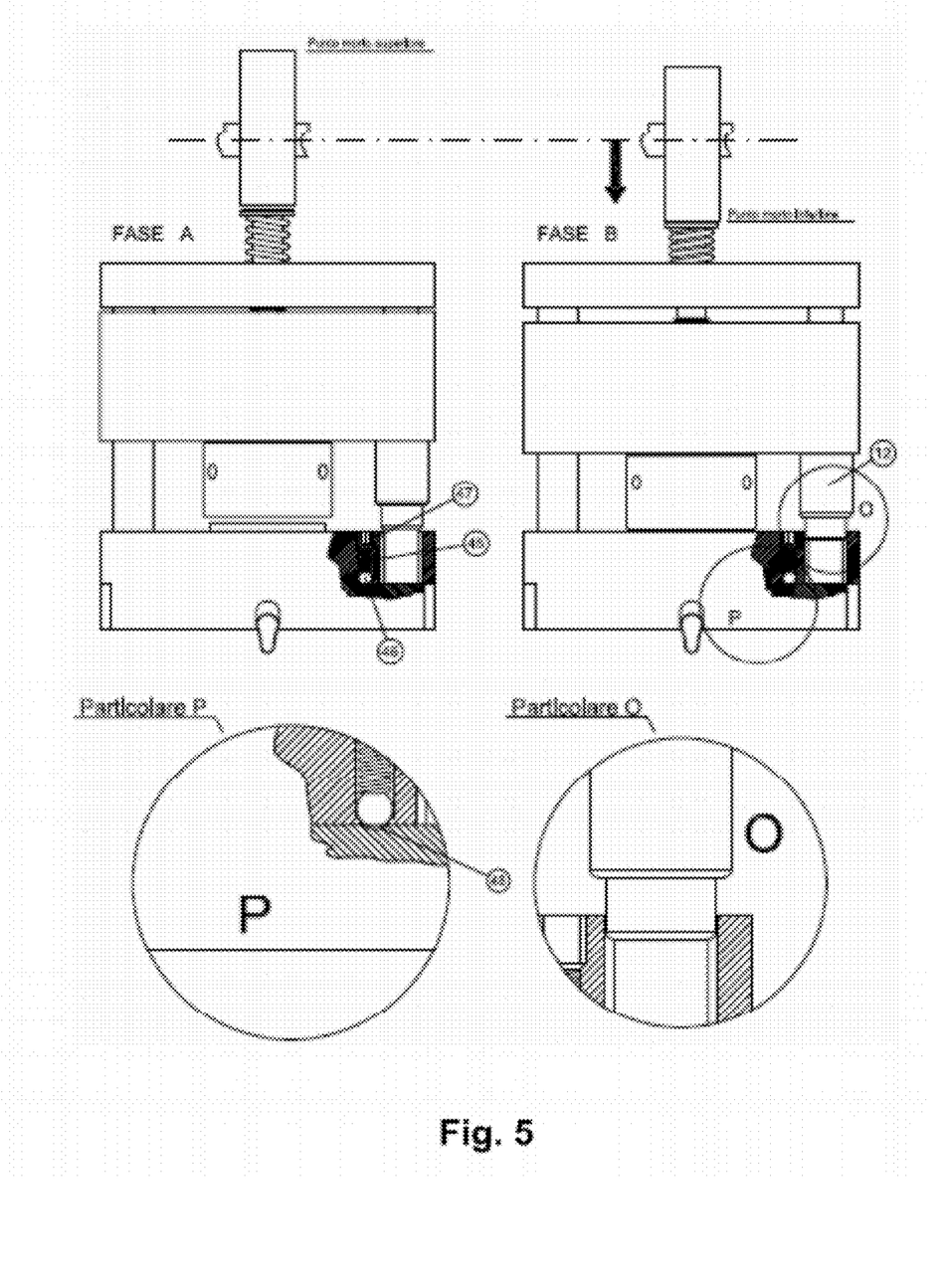
FIG. 5 shows the system connecting the two bodies and the tamping motion on the capsule.

With the machine in stand-by, the pressure cam 7 is at the top dead center (Phase A in FIG. 5). This cam connected to the motor shaft 10 by means of a threaded dowel 44 rotates inside the motor flask 4; on the same shaft the coffee brewing cam 19 is connected by means of a screw 18.

By means of the knob 37 the rotating part of the capsule-holder body is manually rotated clockwise; the sensor shaft 29, tensioned by the helical spring 42 (FIG. 3), pushes forward the used capsule 14 from the fixed body. The front extractor 35, fastened on the motor shaft 4 by means of the front extractor-supporting shaft 16 and the elastic pin 34, during the rotation of the rotating body, serves to hold and make the capsule fall by gravity. The system comprising the rear sensor shaft and the front extractor ensures the discharge and fall of the used capsules into a small container, in case the capsule is jammed in the lodging of parts 2 and 3 of the capsule-holder body due to some strains or adhesions produced by the pressure and the temperature.

Figure 4:
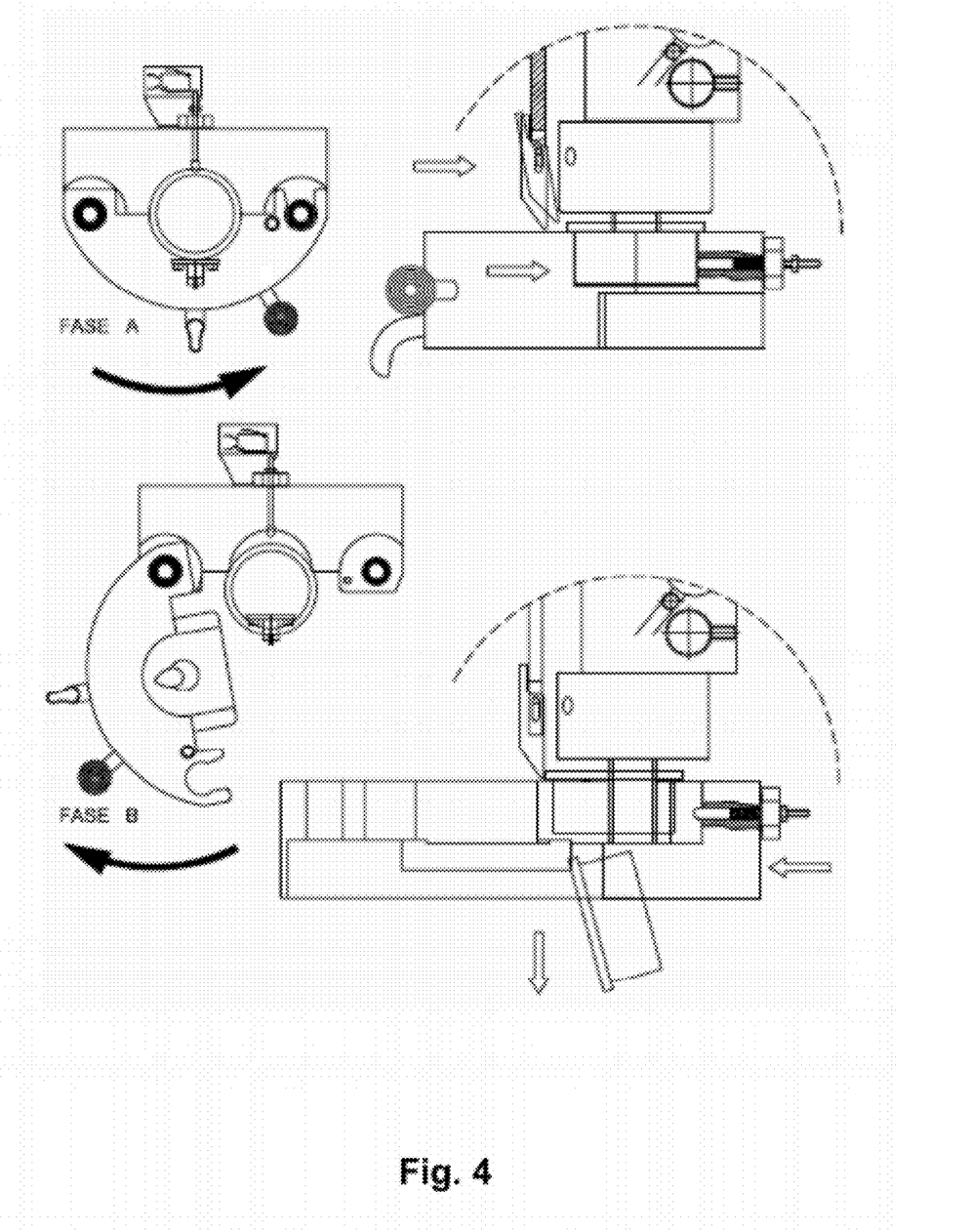
FIG. 4 shows the fixed part rotating part of the capsule-holder's body with the hinge mechanism and the capsule removal system according to a first embodiment of the invention.

The rotating motion of the rotating part 2 of the capsule-holder body makes the mechanism ready for the placing of a new capsule for the next brewing, as shown in FIG. 4 (Phases A and B). After the capsule is positioned on the rotating part 2, the manual rotation, counterclockwise, closes and connects said rotating part 2 and fixed part 3 of the capsule-holder body.

Figure 8:
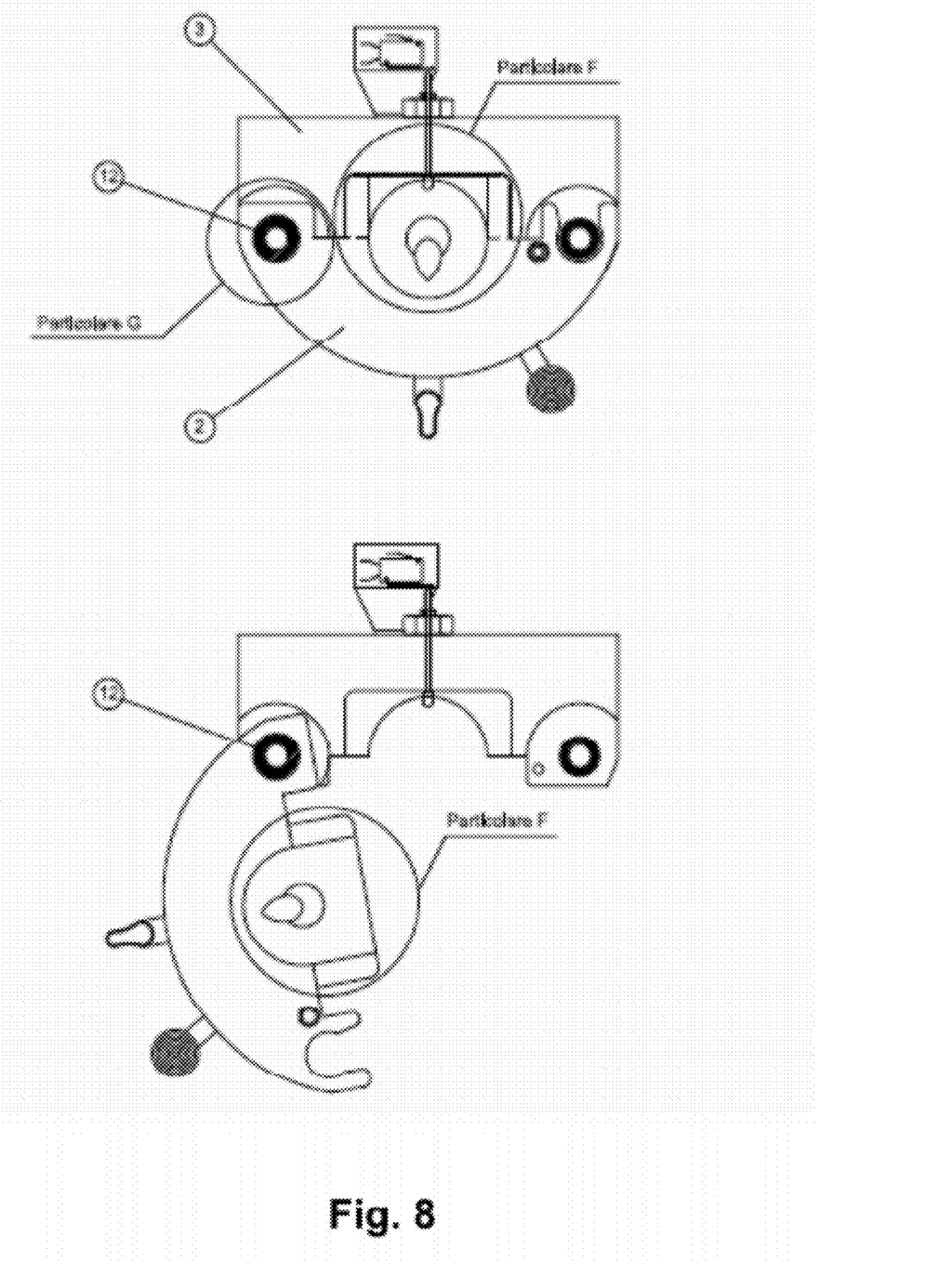
FIG. 8 shows the hinge mechanism between the porta-capsule bodies, the grooving and tonguing joint.

The correct positioning of the two parts takes place thanks to the hinge created between said parts and the fulcrum of the grooving 11 (detail G of FIG. 8) and to the tonguing joint (detail F of FIG. 8) and guide ball 46 (detail P in FIG. 5) kept pressed by an helical spring 45, sited in the spherical slot 48 on the fixed part of the capsule-holder body.

When closing, the sensor shaft 29, fastened on the fixed part of the capsule-holder body by a clamping screw 30, is forced to counterbalance the spring 42, and is pushed toward the micro-switch lever 33, which feeds the electrical circuit of the electro-motor 21.

Such motor rotates the pressure cam 7 of 180°, up to the bottom dead center (Phase B of FIG. 5), determining a pressure on the tappet 9 that brings the heat exchanger 5 near the piston 6, connected by an infusion cycler 43, towards the cap to reach a perfect adhesion piston/capsule and a satisfactory infusion pressure.

The infusion piston stroke towards the capsule shapes the lodging of the locking bushing 12 (detail O of FIG. 5) into the slot on the rotating part of the capsule-holder body creating a ring coupling that connect the two parts 2 and 3, during the coffee brewing (Phase B of FIG. 5)

Figure 6:
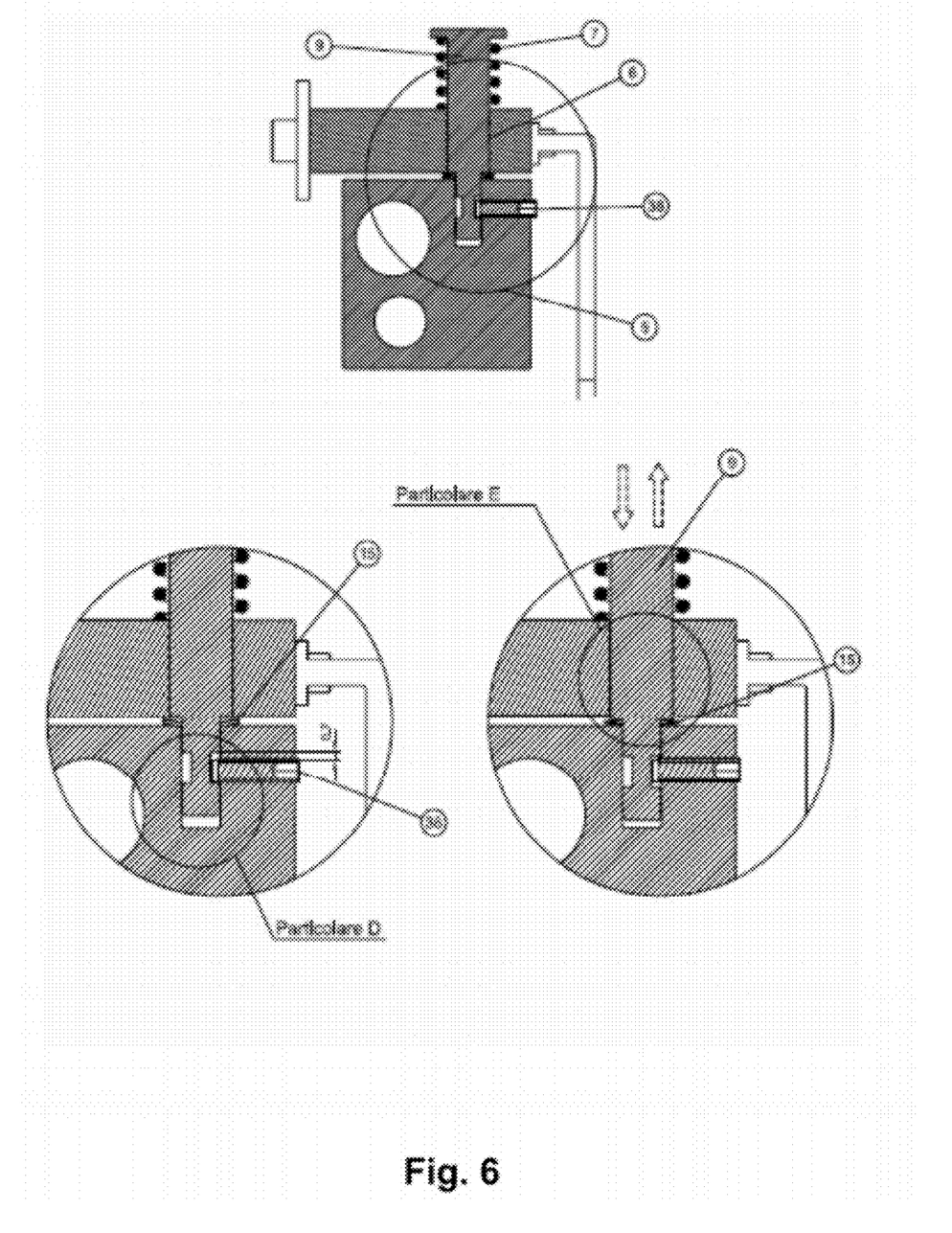
FIG. 6 shows the functioning of the sliding system of the capsule adjustment.

The perfect seal between the capsule and the infusion piston 6, during the brewing of coffee, is ensured by other factors. First, the right regulation of the distance between the capsule and the piston by rotating clock- or counterclockwise the piston 6, threaded to the infusion cycler 43. The second factor is the flexible slide (detail E of FIG. 6), controlled by two Belleville washers 15, of the tappet 9 in the lodging on the heat exchanger 5 that allows any further adjustment due to any possible flaw of the capsule, with a stroke of 0.7 mm (detail D of FIG. 6), controlled by the socket head screw 36. The third factor relates to an O-ring 27, positioned on the lodging on the piston, that ensures a perfect adhesion to the capsule and, consequently, a perfect seal.

Figure 7:
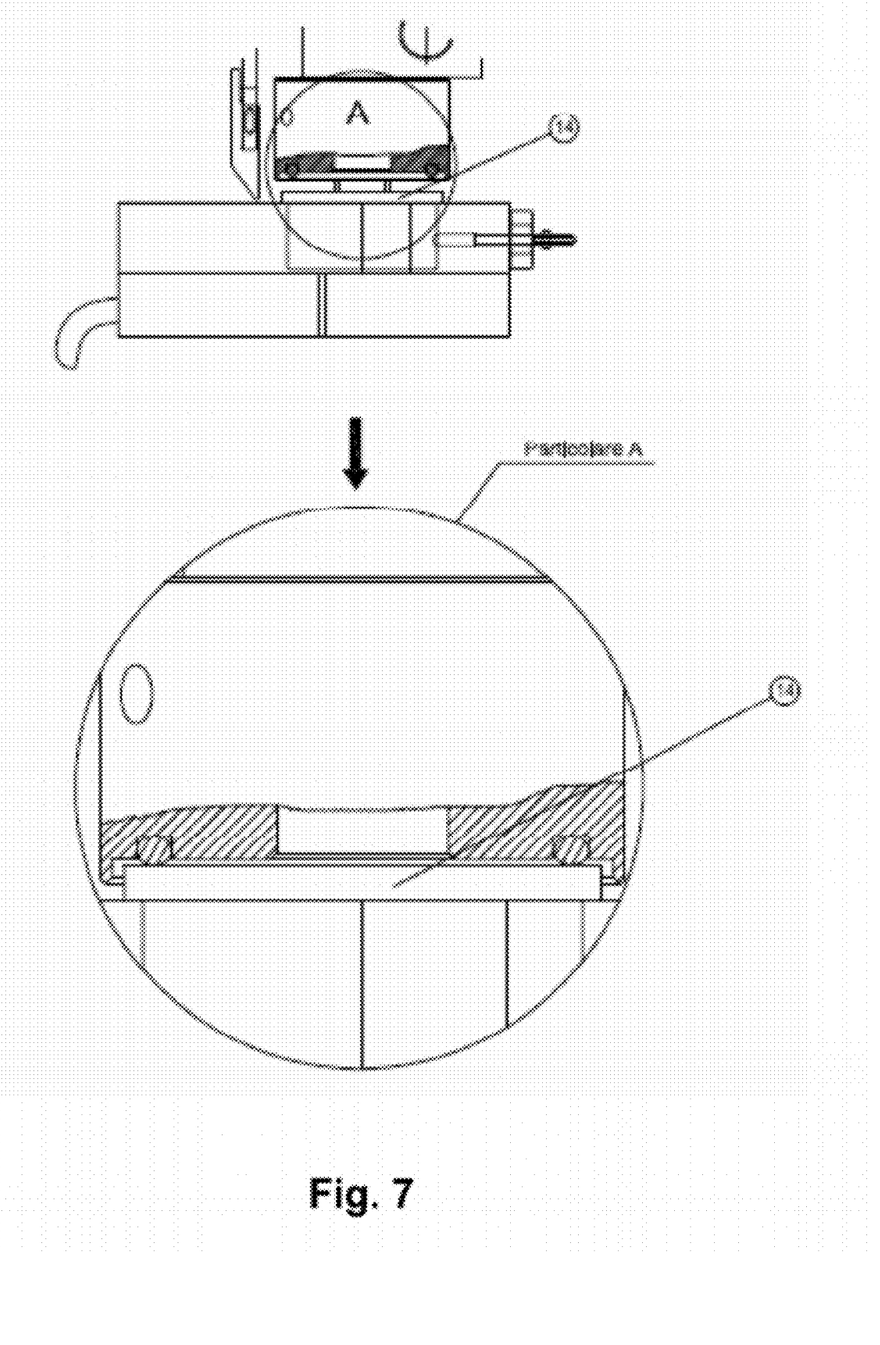
FIG. 7 shows the flare on the piston that prevents possible spurts of coffee or hot water within the machine body.

The synchronism of the brewing cam 19 and the pressure cam 7 allows, when the pressure cam reaches the bottom dead center (BDC), as shown by Phase B of FIG. 5, that the electrical circuit controlled by the micro-switch 20 breaks off the feed of the electro-motor 21 and acts the electro-pump 24, producing the brewing of the coffee. The geometric truncated-conical shape on the infusion piston, close to the contact with the capsule (detail A of FIG. 7), suitable to avoid possible coffee or hot water spurts, is another safety element.

Once the brewing is accomplished the electro-mechanism stops the electro-pump circuit and acts the electro-motor so that the pressure cam reaches the top dead center (TDC), allowing the capsule to separate from the assembly piston-accelerator-tappet by means of the helical spring 8 and making the system ready for a new brewing.

In this preferential embodiment of the invention there are other components: a second grooving 13, a clamping screw 17 of the brewing cam, a clamping screw 22 of the coffee group, a rotation lever 23 of the accelerator, a regulating nut 28 of the sensor shaft, a clamping screw 32 of the heater, a screw 40 to rotate the accelerator, a clamping screw 41 of the accelerator, and a ball 47. All the mechanical components, single or coupled, are made with high standards of quality.

Figure 9A:
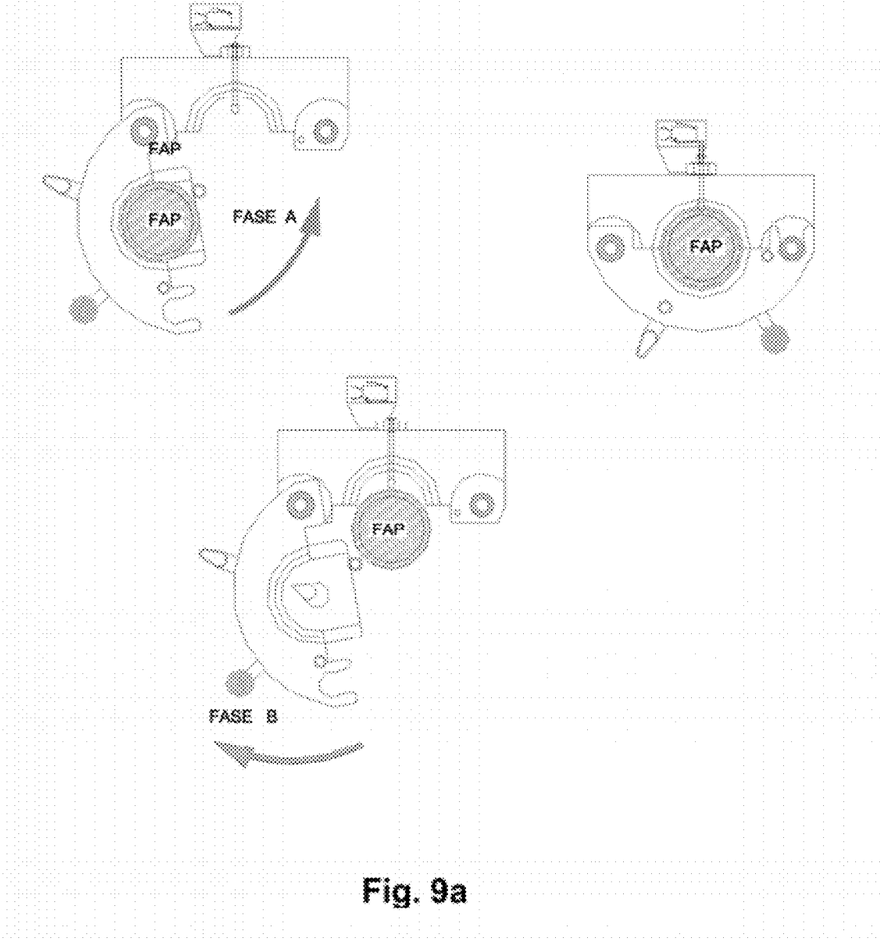
FIGS. 9*a* and 9*b* show the fixed part and rotating part of the porta-capsule body with the hinge mechanism and the removal system according to a second embodiment of the invention.
Figure 9B:
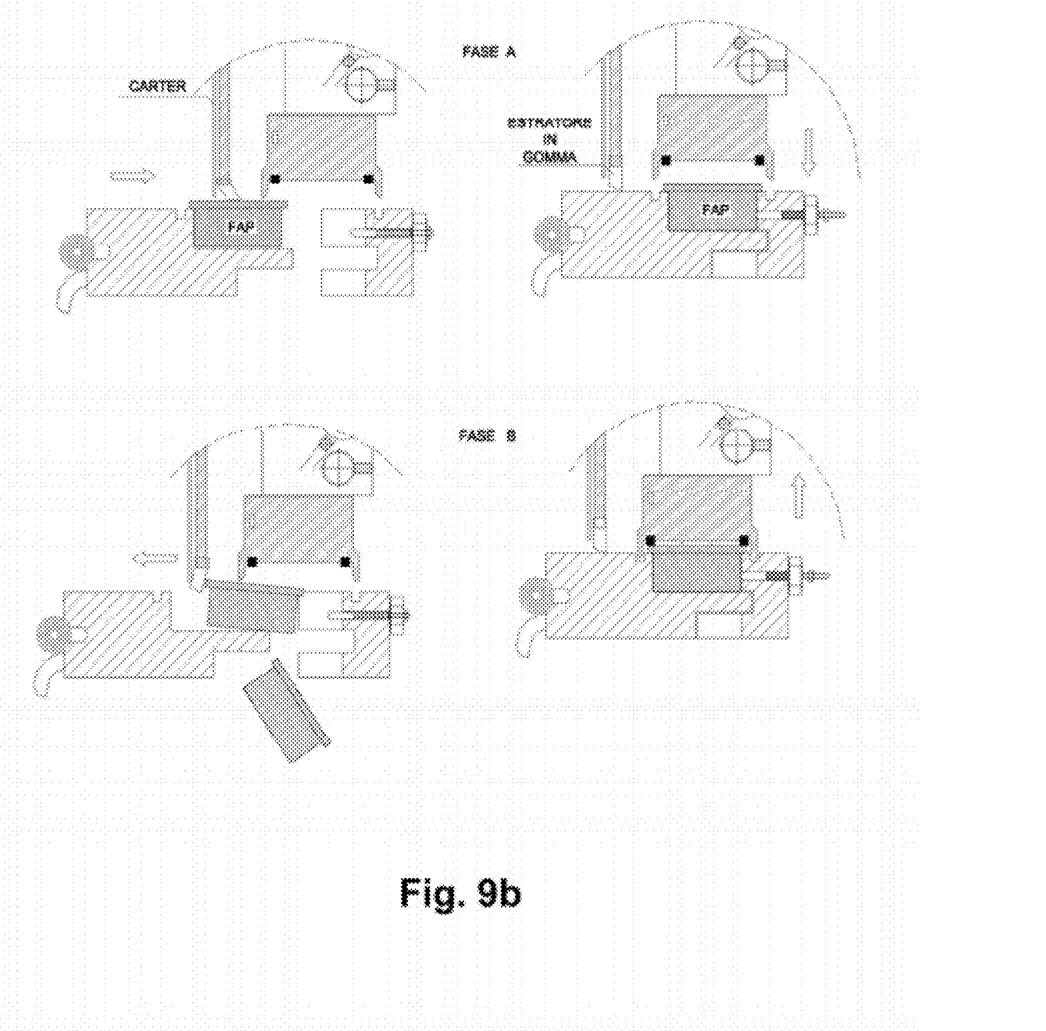
Figure 10:
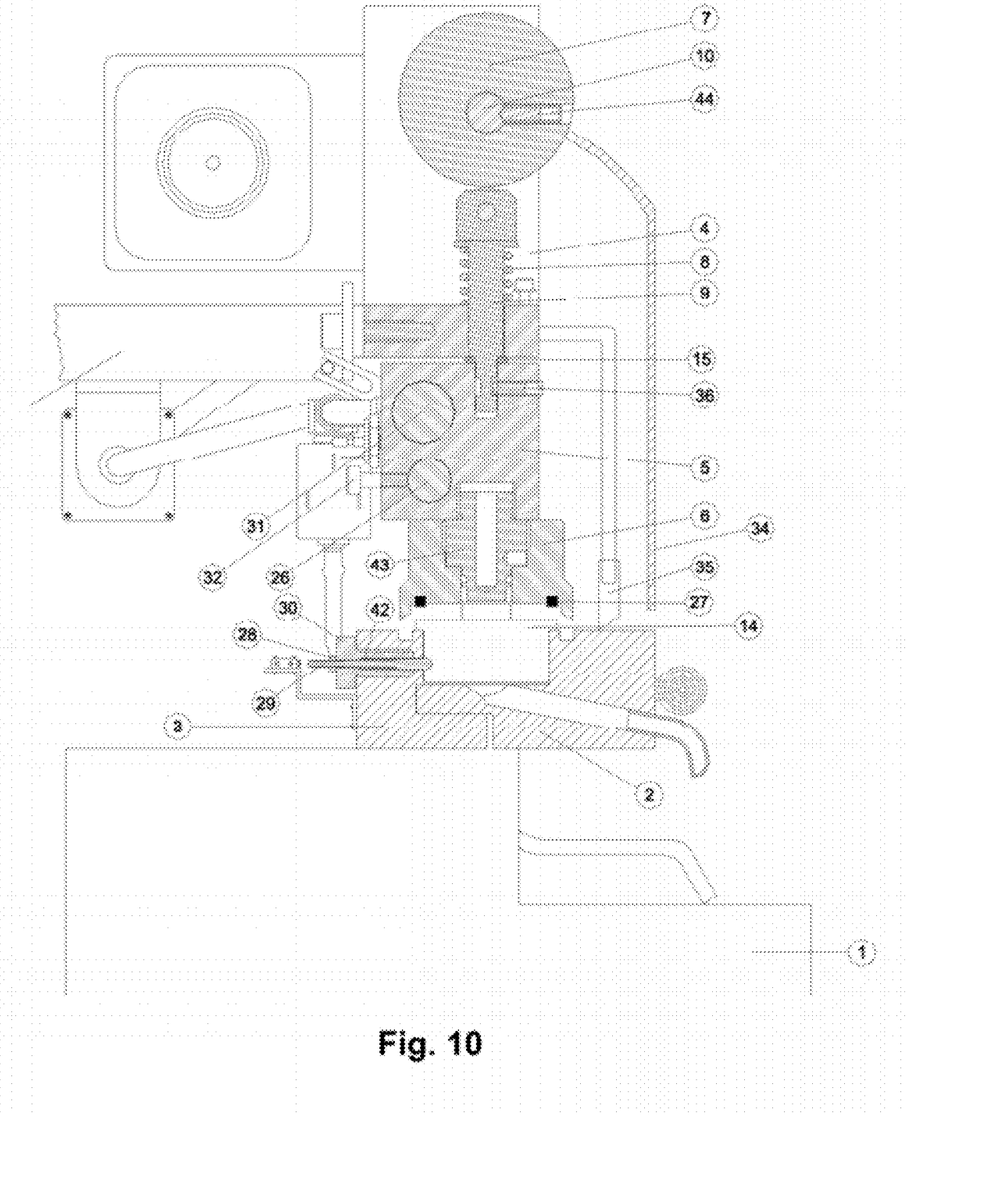
FIG. 10 shows a longitudinal section of the center line and the assembling system of the mechanical elements according to said second embodiment of the invention.

Another useful way to manufacture the capsule-holder body is shown in FIGS. 9a, 9b and 10. Here, the rotating part 2 of the capsule-holder body is made of plastic, while the gravity extractor 35 is supplied with a rubber terminal. This implies a modification of the infusion piston 6 and the increase of its stroke. When closed, in fact, this piston presses on the capsule, stops the rotating part of the capsule-holder body preventing it from opening. In this way the fixing by the tonguing joint and the pressed ball can be avoided.

The manufacturing details, the materials and the shape of the espresso machine with disposable filter or capsule or similar can vary but remaining within the field of the invention and the patent.

The invention claimed is:

1. An espresso coffee machine using a disposable filter or capsule and equipped with a semi-automatic system to brew espresso coffee, comprising:
   a chassis (1), a heat exchanger (5), an electro-pump (24), an infusion piston (6) operated by a coffee brewing cam (19), control and regulation means and supporting means;
   a semi-automatic mechanical system to load, hold and discard by gravity the disposable filter or capsule;
   a mechanical system of sealing and applying pressure on the disposable filter or capsule wherein the sealing effectiveness between a disposable filter or capsule (14) and the infusion piston (6) is ensured by the clamping given by a vertical mechanical motion of the infusion piston (6) caused by the rotation of a pressure cam (7) and wherein said sealing and applying pressure action is fully adjustable to compensate for any disposable filter's or capsule's size differences; said mechanical system of sealing between the capsule (14) and the infusion piston (6) is ensured by an O-ring (27) and by a macro-adjustment of the distance between the infusion piston (6) and the capsule (14), carried out by the rotation of the infusion piston (6), threaded to an infusion cycler (43), and by a micro-adjustment consisting in the sliding up or down of a tappet (9) controlled by the spring action of two Belleville washers (15) mounted on the tappet (9) which is locked in place to the heat exchanger (5) by a socket head screw (36); said infusion piston (6), connected to the heat exchanger (5) by an infusion cycler (43), has a truncated-conical shape near the contact area with the capsule (14), to avoid possible spurts of coffee or hot water;

an electro-mechanical control system to verify that the disposable filter or capsule is properly lodged inside a capsule-holder body before allowing the brewing of the coffee.

2. An espresso coffee machine according to claims 1 wherein the semi-automatic mechanical system to hold and discard the disposable filter or capsule, is comprising:

a capsule-holder body made of a rotating part (2) and a fixed part (3), reproducing the exact shape of the disposable filter or capsule (14);

a rear sensor shaft system (29) and a front extractor (35), located in a way to insure the removal and fall of the capsule into a suitable container; said front extractor (35) being equipped with an optional rubber terminal (49) to prevent the rotating part (2) of the capsule-holder body to open during the coffee brewing.

3. An espresso coffee machine according to claim 2, wherein the semi-automatic mechanical system to hold and discard the disposable filter or capsule allows an approximately 60 degrees rotation of a rotating part (2) of the capsule-holder body, hinged by a grooving (11) to a fixed part (3) of the capsule-holder body, thus making the system ready to accept a next capsule for a next coffee-brewing cycle.

4. An espresso coffee machine according to claim 3 wherein the positioning of the rotating part (2) and fixed part (3) is achieved by the grooving and tonguing joint and a ball (46) pressed on the bottom of the rotating part (2).

5. An espresso coffee machine according to claim 3 wherein said rotating part (2) of the capsule-holder body is made of plastic.

6. An espresso coffee machine according to claim 1 wherein said mechanical system of sealing and applying pressure on the disposable filter or capsule is carried out by the pressure cam (7) which is rotated by an electric motor (21); said pressure cam (7) causes the descent of the infusion piston (6) on the capsule (14) and, concurrently, the brewing cam (19) triggers the electro-pump (24) to feed the brewed coffee.

7. An espresso coffee machine according to claim 1 further comprising a plurality of micro-switches connected to an electrical or electronic circuit, which provide an easier and safer use of the machine with only one manual operation, that is the loading and removal of the disposable filter or capsule.

* * * * *